(12) United States Patent
Lilly et al.

(10) Patent No.: US 6,474,289 B1
(45) Date of Patent: Nov. 5, 2002

(54) AUTOMATIC SWITCHING DUPLEX FILTERHEAD AND DIESEL FUEL CONDITIONING SYSTEM

(75) Inventors: Keith Lilly, Cookeville, TN (US); Byron A. Pardue, Cookeville, TN (US); Paul D. Miller, Cookeville, TN (US); Robert R. Brackett, Cookeville, TN (US)

(73) Assignee: Fleetguard, Inc., Cookville, TN (US)

( * ) Notice: Subject to any disclaimer, the term of this patent is extended or adjusted under 35 U.S.C. 154(b) by 0 days.

(21) Appl. No.: 09/596,959

(22) Filed: Jun. 20, 2000

Related U.S. Application Data
(60) Provisional application No. 60/140,615, filed on Jun. 23, 1999.

(51) Int. Cl.[7] ................................................ F02B 77/00
(52) U.S. Cl. .................... 123/198 D; 210/91; 210/340
(58) Field of Search ............................ 210/91, 85, 340, 210/341; 137/599.14; 123/196 R, 557, 198 D (56) References Cited

U.S. PATENT DOCUMENTS

| | | | |
|---|---|---|---|
| 1,042,203 A | 10/1912 | Dahl | |
| 1,919,031 A | * 7/1933 | Muhleisen | 137/599.14 |
| 2,505,375 A | * 4/1950 | Wohlfarth | 137/599.14 |
| 2,921,687 A | * 1/1960 | Jenkins | 137/599.14 |
| 3,077,989 A | 2/1963 | Larkin | 210/98 |
| 3,341,019 A | 9/1967 | Florkowski | 210/132 |
| 3,572,507 A | 3/1971 | Juskevic | 210/97 |
| 3,915,866 A | * 10/1975 | Brown et al. | 210/341 |
| 4,033,870 A | 7/1977 | Parquet et al. | 210/90 |
| 4,035,295 A | 7/1977 | Pluequet | 210/136 |
| 4,201,044 A | 5/1980 | Dodd | 60/39.09 |
| 4,246,110 A | 1/1981 | Jarrett | 210/90 |
| 4,303,513 A | 12/1981 | Lundquist | 210/132 |
| 4,427,545 A | 1/1984 | Arguilez | 210/333.1 |
| 4,496,463 A | * 1/1985 | Desai et al. | 137/599.14 |
| 4,615,800 A | 10/1986 | Stifelman et al. | 210/132 |
| 4,664,798 A | 5/1987 | Bergh | 210/241 |
| 4,783,271 A | 11/1988 | Silverwater | 210/742 |
| 5,105,063 A | 4/1992 | Hockemeier | 219/205 |
| 5,458,767 A | 10/1995 | Stone | 210/90 |
| 5,649,515 A | * 7/1997 | Fuchs et al. | 123/557 |
| 5,670,038 A | 9/1997 | McKinney | 210/98 |

FOREIGN PATENT DOCUMENTS

| | | |
|---|---|---|
| DE | 550281 | 4/1932 |
| DE | 77 31 211 | 6/1978 |
| DE | 34 42 980 A1 | 5/1986 |
| DE | 37 39 614 A1 | 6/1989 |
| EP | 0 835 682 A1 | 4/1998 |
| GB | 2 303 082 A | 2/1997 |

* cited by examiner

Primary Examiner—Noah P. Kamen
(74) Attorney, Agent, or Firm—Woodard, Emhardt, Naughton, Moriarty & McNett

(57) ABSTRACT

An apparatus for conditioning fluid. In one embodiment of the present invention, there is an apparatus which comprises two filters and an electrically actuatable switching valve. Fluid provided to the apparatus may be routed to either filter by the switching valve. A controller positions the valve to provide fluid to a particular filter based on a measurement of pressure downstream of the filter, provided that the temperature of the fluid is above a predetermined level. Further, the invention includes proximity switches by which the controller can determine the coupling or uncoupling of a filter from the body. Various fuel heaters are provided for heating the fuel.

22 Claims, 5 Drawing Sheets

AUTOMATIC SWITCHING DUPLEX FILTERHEAD AND DIESEL FUEL CONDITIONING SYSTEM

CROSS REFERENCE TO RELATED APPLICATIONS

This application claims the benefit of U.S. Provisional Application No. 60/140,615, filed Jun. 23, 1999.

BACKGROUND OF THE INVENTION

The present invention relates to an apparatus for conditioning fluid used in conjunction with an internal combustion engine. More specifically, the present invention relates to an apparatus for filtering fuel for a diesel engine.

Fluids used in conjunction with an internal combustion engine, such as engine lubricating oil, transmission fluid, engine coolant, and engine fuel, often require continuous filtering so as to prevent contaminants in the fluid from depositing on and adversely affecting components of the engine and related systems. On internal combustion engines which are operated continuously or near-continuously for long periods of time, such as diesel engines used to generate electrical power and diesel engines in trucks, the large quantity of fluid passing through the filter, in combination with partially contaminated fluids such as lower quality diesel fuel, result in operational difficulties and/or unexpected engine shut-downs due to premature filter plugging.

Servicing of the filter in the continuous and near-continuous operational applications presents problems for the operators. Usually, the clogged filter requires human intervention. Further, the engine is typically shut down to change the filter. In many cases, changing the filter results in significant leakage of the fluid into the environment and a loss of the priming of the fluid-receiving system.

Systems such as diesel engine fuel systems often require a variety of components to condition the fuel prior to introduction in the pump and/or injectors. This conditioning may require heating by one or more types of fluid heaters, measurement of fuel pressure and fuel temperature, and water separation, as well as filtering. Often these different functions are handled by a variety of components placed throughout the installation area of the engine. As a result, fuel tubing is routed to numerous locations, individual attachment sites must be found for each component, and the total fluid conditioning system weight and expense is greater than the weight and expense of a unified system.

What is needed is an apparatus that overcomes these problems. The present invention does this in a novel and unobvious way.

SUMMARY OF THE INVENTION

One aspect of the present invention concerns an apparatus for an internal combustion engine cooled by a liquid coolant, comprising a reservoir of fluid, a body provided with the fluid, a first removable filter coupled to the body, and a second removable filter coupled to the body. There is a valve actuatable between a first position and a second position, the first position placing the first filter in fluid communication with the fluid and the second position placing the second filter in fluid communication with the fluid. The apparatus includes various means for heating the fluid in the body. These and other objects and advantages of the present invention will be apparent from the description of the preferred embodiment, the claims, and the drawings to follow.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates to an apparatus for conditioning a fluid such as oil, fuel, transmission fluid, or other fluid used with an internal combustion engine, including but not limited to a diesel engine. Some embodiments of the present invention are part of a vehicle, such as a truck, bus, or car, whereas other embodiments are stationary, such as part of an installation for an electrical generator driven by an internal combustion engine.

The apparatus includes first and second removable filters coupled to a body. During most periods of operation, the fluid is provided to one of the filters for removal of contaminants. The cleaned fluid is then provided to the particular system of the internal combustion engine, vehicle, or ground generator. However, when the filter in use becomes clogged, a controller senses an abnormal pressure proximate to the filter in use and then actuates a valve to isolate the filter in use and provide the fluid to the other filter.

In a preferred embodiment of the present invention, the controller actuates the valve from a first position to a second position by sending a driving signal to an electric motor, the rotary motion of which is transformed into linear motion of the valve. The controller preferably senses the need to switch filters by a signal received from a vacuum sensor or vacuum switch in fluid communication with the outlet of the filter. When the controller senses a sub-atmospheric pressure below a predetermined pressure level, and also senses by way of a temperature sensor that the temperature of the fuel is above a predetermined temperature level, the controller determines that the filter in use is clogged or full of contaminant and that a switch to the other filter is required. By sensing a partial vacuum instead of a differential pressure, the fluid passageways of the body can be simplified by providing a single pressure to the vacuum sensor. Further, use of a vacuum sensor with a single port for fluid communication is less likely to leak than a differential pressure transducer. Further, for those pressure transducers utilizing internal diaphragms, rupture of a diaphragm in a vacuum sensor does not present a path for the bypassing of contaminated fluid around the filter, such as is the case with a differential pressure transducer diaphragm.

By measuring the level of vacuum downstream of the filter in use, the present invention automatically switches from a full filter to an unused filter based on the condition of the filter in use, and not only based on the number of hours accumulated by the filter. For example, a manufacturer's instruction to change filters at a predetermined number of hours or miles does not take into account the quality of the fluid being provided to the filter. If the fluid being conditioned is diesel fuel, as an example, the use of dirty diesel fuel may require filter changing in fewer hours than specified by the manufacturer. However, the vacuum sensor of the present invention will permit detection of this clogged condition as it occurs, irrespective of the number of hours. Some embodiments of the present invention also include a cumulative hour meter for estimating the number of hours that the filter has been in use. If the estimated hours of usage exceed a predetermined number of hours, then the controller switches filters.

The controller also preferably senses whether either of the filters have been uncoupled from the body by detecting a change of state in either of a pair of proximity switches which are located near the filter canisters when they are coupled to the body. Thus, after controller 50 has detected the uncoupling of a filter previously declared full and/or the coupling of a new filter to the body, the previous logical declaration of a full condition is changed to a condition indicating useful life. Preferably, the proximity switches detect coupling and/or uncoupling by a change in a magnetic field of the proximity switch caused by the movement of the filter.

In some embodiments of the present invention, the controller is able to indicate to the user viewing the body which filter is in use and whether or not either filter has been declared clogged by light-emitting diodes (LEDs) attached to the body. Yet other embodiments of the present invention include an indicator light located near the operator or on the dashboard to provide information from the controller to the operator. One embodiment of the present invention also includes one or more means for heating the fluid prior to the fluid entering the filter. One embodiment of the present invention includes a thermostatically controlled supply of engine coolant to internal passageways of the body that warm the body and thereby warm the engine fluid. Another embodiment of the present invention includes a resistive heating element controlled by a second thermostat and powered by the electrical system of the engine or vehicle, such as a 12-volt direct current (vdc) electric heating element. Another embodiment of the present invention includes a resistive heating element that is powered by a ground-based electrical power source, such as 120-volt alternating current (vac) electric heating element. After the engine fluid has been heated by any one or combination of heaters, the temperature of the fuel is sensed by a temperature sensor which sends a signal corresponding to fluid temperature to the controller. If fluid temperature is lower than a predetermined temperature, the controller will assume that a fluid pressure lower than a predetermined pressure level is a result of fluid viscosity being too high, and/or a build-up of low temperature blocking substances such as wax on the filter element.

One embodiment of the present invention provides the ability to switch from one filter to another filter with the engine running. Switching filters with the engine running can be a problem if the unused filter includes trapped air and the fluid being conditioned is provided to a system that is sensitive to air. For those embodiments where the system being provided with the fluid is sensitive to ingestion of air, the controller provides for a controlled transition from the first position of the valve to a second position of the valve through a third position of the valve. In the third position both filter inlets are in fluid communication with the reservoir of fluid and both fluid outputs are in fluid communication with the system being provided the fluid, such that any trapped air in the new filter is gradually introduced into the system. The controller maintains the valve in the third position for a predetermined length of time. In a most preferred embodiment of the present invention, the controller actuates the valve to modulate both the opening of the unused filter and the closing of the used filter. In this most preferred embodiment the new filter is gradually opened as the filter in use is gradually closed.

In another embodiment of the present invention, the switching valve positively seals both the inlet and the outlet of the filter not in use. By sealing both the inlet and the outlet, the unused filter may be removed with the engine running without gross leakage, loss of fluid priming in the engine system, or ingestion of air into the engine system. In yet another embodiment of the present invention, the various devices, including the thermostat, vehicle or engine powered electric heating element, ground-base powered electrical heating element, the actuatable valve, the vacuum pressure sensor or vacuum switch, the temperature sensor, the proximity switches, the LED displays, the controller, and mounting provisions for both filters are all coupled to a single body, or more preferably to a plurality of bodies that are fastened to one another.

Figure 1:
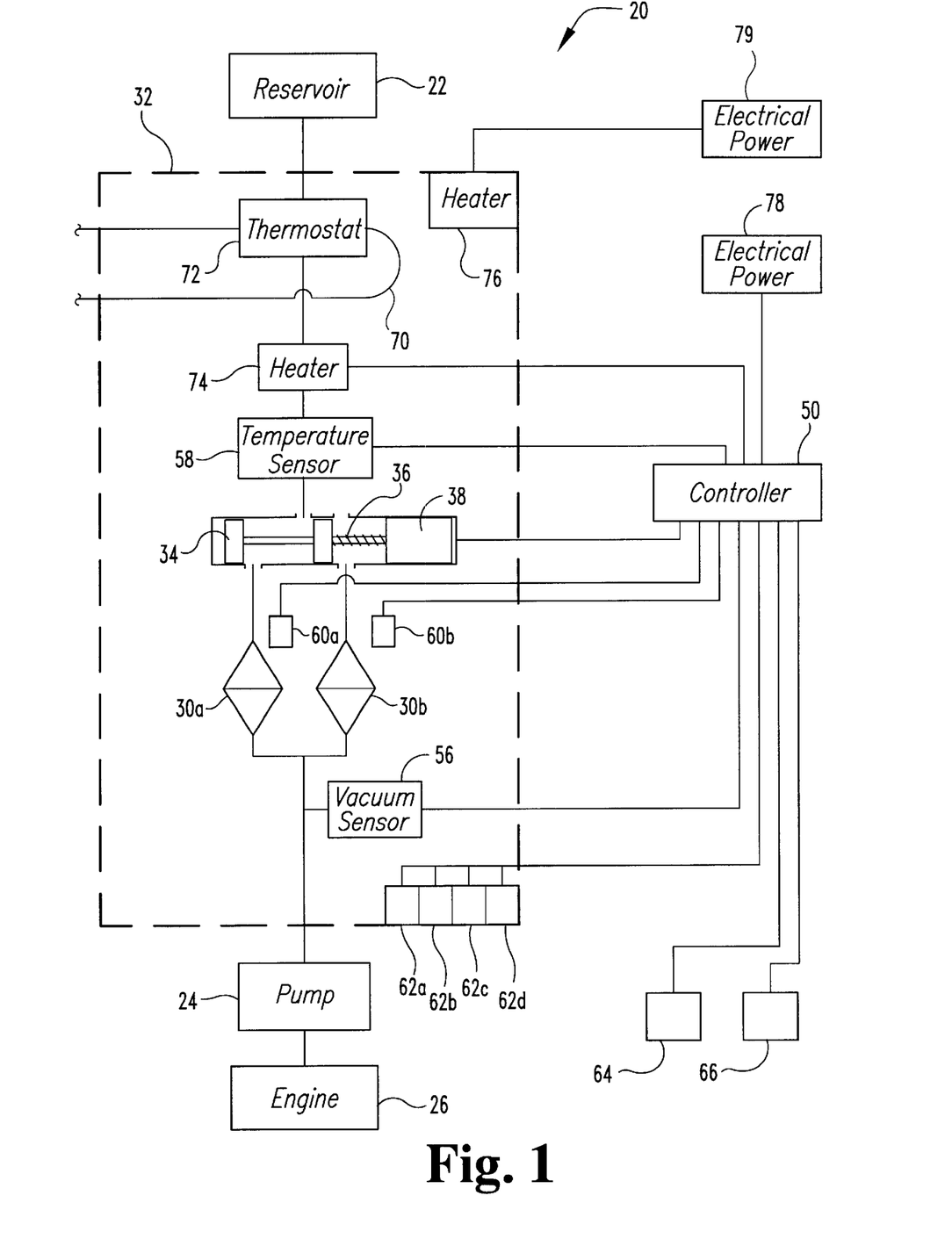
FIG. 1 is a schematic representation of one embodiment of the present invention.

FIG. 1 schematically depicts one embodiment of the present invention. Apparatus 20 conditions fluid drawn from a reservoir 22 by a pump 24 and provided to a system of an engine 26. Those of ordinary skill in the art will recognize that reservoir 22 may be an engine oil sump, transmission sump, fuel tank, or other source of fluid used with an internal combustion engine. Likewise, pump 24 may be an oil pump, transmission fluid pump, or other pump associated with an engine or vehicle system, the system being the receiver of the conditioned fluid. Further, those of ordinary skill in the art will recognize that although FIG. 1 depicts pump 24 as being located downstream of apparatus 20, the present invention also contemplates those embodiments where pump 24 provides fluid under pressure to apparatus 20. Further, it is understood that engine 26 may be part of a vehicle, part of a ground-based electrical power generator, or other installation using an internal combustion engine.

Figure 3:
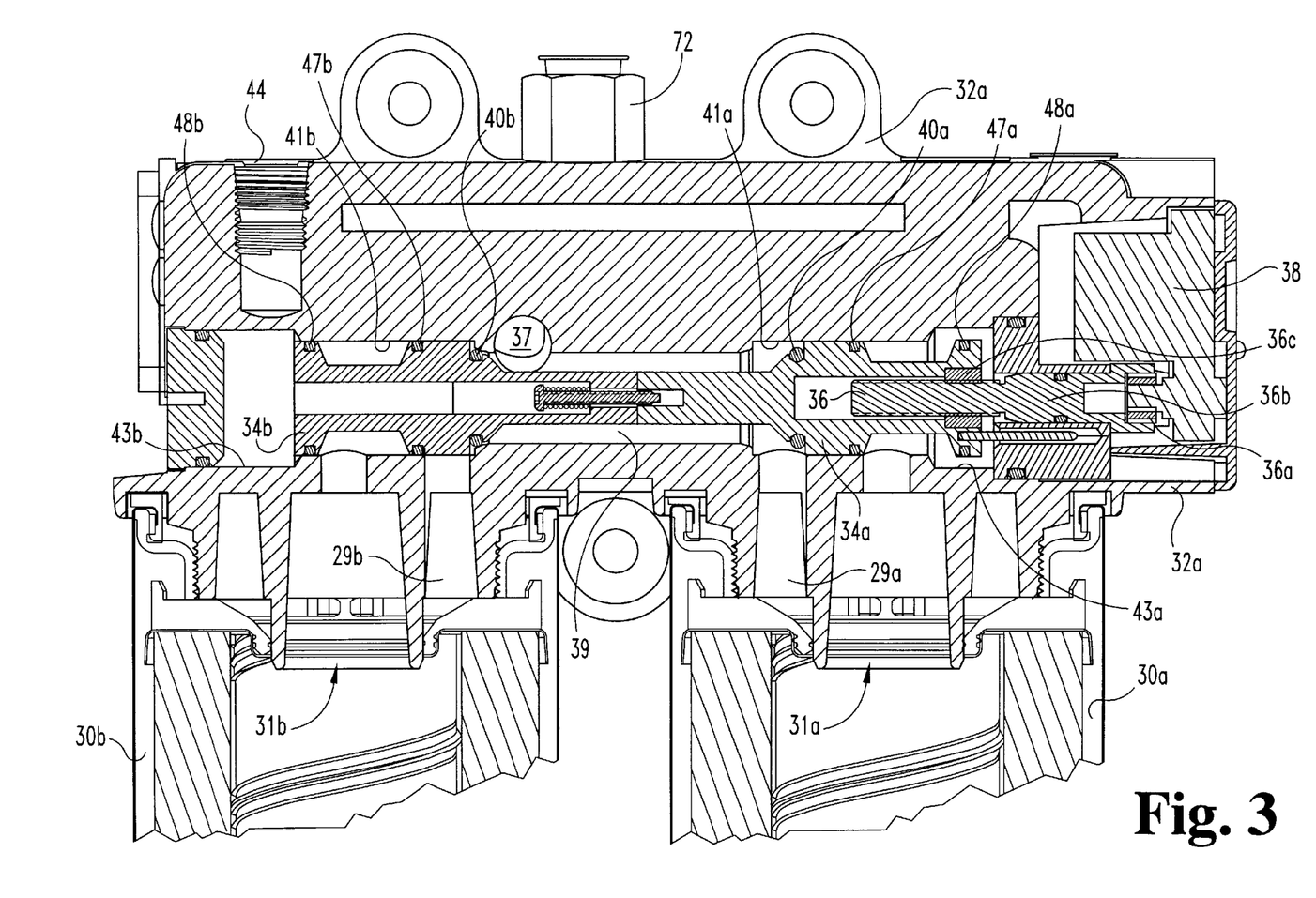
FIG. 3 is a cross-sectional drawing of the apparatus of FIG. 2, the cross-sectional plane intersecting the centerline of the valve and the centerlines of the filters.

Apparatus 20 includes a pair of filters 30 that remove contaminants from the fluid. Filters 30 are preferably of a conventional, spin-on canister-type. In one embodiment of the present invention the filtration element is chemically treated to aid in the separation of water from the fluid, such that the water drains down the external surface of the filtration element and collects at the bottom of the canister for subsequent removal. In a most preferred embodiment, filters 30 include internal threads for spin-on coupling to a body 32a as best seen in FIG. 3, the threads most preferably having a pitch diameter between about 3 and 3.5 inches. An attachment thread within this size range has been found to minimize the vibration of filters 30 that would otherwise chafe and reduce the sealing ability of the filter-to-body seal. However, those of ordinary skill in the art will recognize the applicability of the present invention to filters with smaller or larger attachment threads. Also, the present invention contemplates the use of any filter media with a finite life, or which is not regenerative. For example, the present invention includes cartridge filters.

The two filters 30 are virtually identical to each other and this fact is conveyed by use of the same reference numeral.

During the operation of apparatus 20, one of the two filters will become the filter in use and the other filter will be unused, until the filtering function changes from one filter to the other. In the FIG. 3 illustration the two filters 30 become filter 30a and filter 30b in order to be more specific as to which one is being described. However, these two filters, 30a and 30b, are the same two filters 30 of FIG. 1.

Figure 2:
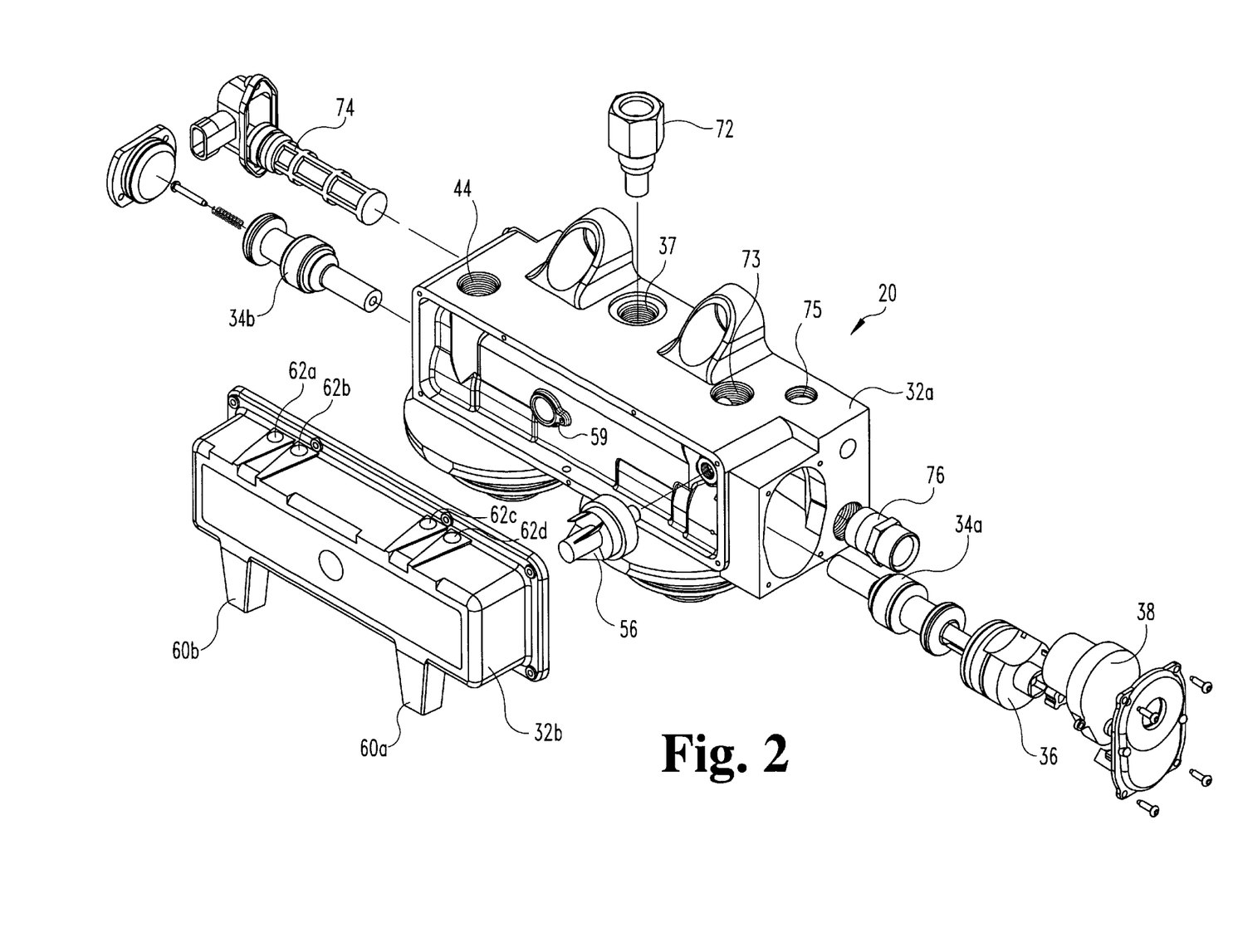
FIG. 2 is an exploded view of one embodiment of the present invention with the filters removed.

In a most preferred embodiment of the present invention, a body assembly 32 supports the various sensors, drive motor, controller, and heaters of the present invention. As best seen in FIG. 2, body assembly 32 comprises a cast aluminum body 32a which supports the heaters, thermostat, valve, drive motor, and sensors of the present invention. Body assembly 32 also comprises a molded plastic body 32b that houses the controller, LEDs, and proximity sensors of the present invention. Bodies 32a and 32b are fastened together into a single unit which may be mounted near the engine.

Returning to FIG. 1, body assembly 32 houses a valve 34, preferably a spool valve, which is actuatable between a first position and a second position. The first position places a first filter 30 in fluid communication with reservoir 22 and pump 24. The first position also prevents flow of fluid through the second filter 30. Valve 34 can be actuated to a second position, most preferably by a rotary-to-linear motion converter 36 which is rotated by a D.C. electric motor 38 controlled by controller 50. In the second position, the second filter 30 is in fluid communication with reservoir 22 and pump 24. The second position prevents flow of fluid through the first filter 30.

Valve 34 may also be placed by controller 50 into a third position which is intermediate of the first position and the second position. In the third position both first filter 30 and second filter 30 are placed in fluid communication with reservoir 22 and pump 24. Controller 50 transitions valve 34 from the first position through the third position to the second position such that valve 34 is in the third position for a predetermined time. During this predetermined time, fluid is provided from both filters 30 and any air trapped in the unused filter 30 is gradually introduced into the engine system. In a most preferred embodiment, the actuation of valve 34 to the third position includes a gradual opening of the unused filter 30 and a gradual closing of the clogged or full filter 30. The predetermined time is most preferably 60±30 seconds. However, those of ordinary skill in the art will recognize other predetermined times which will gradually introduce trapped air into the engine system and minimize abnormal operation of the receiving system.

FIG. 3 depicts a cross-sectional view of the apparatus of FIG. 2 assembled with filters installed, with the cross-sectional plane intersecting the centerline of valve 34 and the centerlines of filters 30a and 30b. Valve 34 comprises substantially similar halves 34a, shown toward the right of FIG.3, and half 34b, shown toward the left of FIG. 3. A spring-loaded shoulder screw fastens valve half 34b to valve half 34a. Valve half 34b supports first diametral seal 47b and second diametral seal 48b that sealingly engage intermediate bore 41b when valve 34 is positioned to the right as shown in FIG. 3. Valve half 34b also supports an inner face seal 40b that sealingly engages a chamfered edge between intermediate bore 41b and inner bore 39. Valve half 34a is arranged substantially the same as described for valve half 34b. In one embodiment of the present invention, valve 34 is a spool valve, and is preferably assembled from multiple sections, although in some embodiments valve 34 is fabricated as a single piece.

With valve 34 positioned as depicted in FIG. 3, fluid provided to inlet passageways 37 is received within inner bore 39. Fluid is provided to an inlet 37 of body 32a, inlet 37 including the internal passageways required to provide the fluid to inner bore 39. As shown in FIG.3, fluid provided to inlet 37 flows into inner bore 39 and toward the right into inlet 29a of filter 30a. Fluid flows through the element within filter 30a into filter outlet 31a. Fluid continues flowing from filter outlet 31a into intermediate bore 41a, to outer bore 43a, and then into the passageways comprising outlet 44. First diametral seal 47a seals inner bore 39 from fluid communication with outer bore 43a and filter outlet 31a. Inner face seals 40a and 40b and first diametral seals 47a and 47b are supported by the innermost spools of valve halves 34a and 34b, respectively. Second diametral seals 48a and 48b are supported by the outermost spools of valve halves 34a and 34b, respectively.

For valve 34 positioned as shown in FIG. 3, valve half 34b has sealed inlet 29b and outlet 31b of filter 30b. Inner face seal 40b is in sealing contact with a chamfer connecting inner bore 39 and intermediate bore 41b, thus preventing flow of fluid from inlet 37 to filter inlet 29b. Intermediate diametral seal 47b seals within intermediate bore 41b and prevents fluid communication from inlet 29b to outlet 31b of filter 30b. Second diametral seal 48b seals outlet 31b of filter 30b from fluid communication with outlet passageways 44 of body 32a. Thus, filter 30b may be removed from body 32a since inlet 29b is sealed and isolated from fluid inlet 37, and filter outlet 31b is sealed and isolated from conditioned fluid outlet 44.

After determining that it is necessary to change the position of valve 34, controller 50 sends a direct current signal to motor 38. Motor 38 rotates in response to the signal from controller 50, and rotates a drive coupling 36a that is part of motion conversion mechanism 36, as best seen in FIG. 3. Drive coupling 36a spins a shaft 36b whose linear position remains relatively fixed while spinning. Shaft 36b threadably engages a collar 36c within valve half 34a. As shaft 36b spins, threaded collar 36c translates in an axial direction along shaft 36b, thus repositioning valve halves 34a and 34b.

The feedback current received from DC motor 38 remains relatively constant until inner face seal 40a or 40b comes into contact with the chamfered transition from intermediate bore 41a to inner bore 39, or intermediate bore 41b to inner bore 39, respectively. Contact between the inner face seal and the bore slows and finally stops the axial movement of valve 34. As the axial motion stops, the rotary motion of motor 38 likewise stops and the impedance of motor 38 decreases, with the result that the feedback current from motor 38 measured by controller 50 increases. This increase in feedback current indicates that a positive seal has been obtained by one valve half. Further, because of the arrangement of valve halves 34a and 34b within the inner, intermediate, and outer bores of body 32a, this current increase also indicates that the other valve half is open. Thus, sealing of inner face seal 40a or 40b and the subsequent sealing of the associated filter inlet is associated with opening of the inlet of the other filter.

In one embodiment of the present invention, controller 50 sends a signal to motor 38 to actuate valve 34 to a third position intermediate the first position and second position. In this third position, neither inner face seal 40a nor inner face seal 40b is in sealing contact with inner bore 39. Thus fluid entering inner bore 39 from inlet 37 may flow into either inlet 29a or 29b. In addition, second diametral seals 48a and 48b move out of contact with intermediate bores 41a and 41b, respectively, such that fluid communication is established from filter outlets 31a and 31b to outlet 44 of body 32a. By slowing transitioning valve 34 and maintaining both filters in fluid communication with outlet 44, it is possible to slowly bleed any trapped air from a new filter 30 into the supplied system, and minimize any adverse behavior by the system caused by the trapped air.

Returning to FIG. 1, controller 50 includes the input/output circuitry necessary to actuate motor 38 and various displays in response to signals received from various sensors. In a most preferred embodiment, controller 50 is a digital controller with controlling software and data stored in one or more read-only memories (ROM) and/or random-access memories (RAM). Embedded software within controller 50 includes controlling software 100, as well as fault detection and accommodation software. Preferably controller 50 includes a minimum 256 bytes of RAM and 8K bytes of programmable ROM. Although a digital controller 50 has been described, those of ordinary skill in the art will recognize that the present invention contemplates other types of controllers, such as analog electronic controllers, as well.

Controller 50 receives a signal corresponding to fluid pressure at the outlet of the filter 30 currently in use from a vacuum switch or vacuum sensor 56. Controller 50 also receives a signal corresponding to temperature of the fluid in body 32 from a temperature sensor 58. In a most preferred embodiment, vacuum sensor 56 is a normally closed vacuum switch known to those of ordinary skill in the art which produces a signal corresponding to fluid pressure. In those embodiments of the present invention in which pump 24 is upstream of apparatus 20, vacuum sensor 56 may be replaced with a differential pressure transducer, which measures the pressure drop across apparatus 20 or across filters 30, or some other pressure drop related to the condition of one or both filters.

Temperature sensor 58 is most preferably a resistance temperature device (RTD) or thermistor known to those of ordinary skill in the art which produces a signal corresponding to temperature of the fluid in body 32a. In one embodiment of the present invention temperature sensor 58 is attached to body 32a at sensor support 59, so as to measure the temperature of body 39 proximate the fluid inlet to thermostat 72. Controller 50 also receives signals from a pair of proximity sensors 60a and 60b. A first proximity sensor 60a is mounted near the first filter 30, and a second proximity sensor 60b is mounted near the second filter 30. As can be best seen in FIGS. 2 and 3, sensor 60a is adjacent filter 30a and sensor 60b is adjacent filter 30b. Each proximity sensor 60a and 60b produces a signal corresponding to the coupling or uncoupling of the corresponding filter 30a or 30b to body 32a. In a most preferred embodiment, proximity sensors 60a and 60b are of a magnetic type known to those of ordinary skill in the art. However, the present invention also contemplates other types of sensors for signaling the coupling and/or uncoupling of a filter canister, including, for example, contact switches, electrical continuity measurement, and optical detection.

Returning to FIG. 1, body 32b includes 4 LEDs controlled by controller 50 for indicating the status of each filter 30a and 30b to the user. LEDs 62a and 62d indicate which filter is presently active. LEDs 62b and 62c indicate a filter that should be serviced because controller 50 has declared it to be out of service life. Key switch input 64 controls a relay (not shown) to provide electrical power to controller 50 when a key is switched on, such as the ignition key of a vehicle. Push-button input 66 switches a relay (not shown) to momentarily power controller 50, such as when a user wants to observe the status of LEDs 62a–d, and perform maintenance by replacing a filter 30. In some embodiments of the present invention, activation of push-button input 66 or key switch input 64, combined with a measurement by vacuum sensor 56 that is not consistent with engine operation, results in controller 50 placing itself in a low power mode, so as to minimize current drain on the battery, yet still display the status of filters 30. For those embodiments of the present invention in which vacuum sensor 56 is a vacuum switch instead of a vacuum transducer, controller 50 assumes that the engine is running whenever key switch input 64 is on. Controller 50 preferably includes an RS232 communications bus for direct interrogation of the digital states of controller 50.

One embodiment of the present invention includes means for heating the fluid, including one or more heaters such as: a supply of liquid coolant 70 from the engine, a direct current electrical heating element 74, or an alternating current electrical heating element 76. Liquid coolant 70 from the engine is provided to various internal passageways of body 32a under the control of a thermostat 72 which controls liquid coolant 70 in response to the temperature of the fluid entering body 32a. In one embodiment of the present invention, thermostat 72 is a spring-biased wax motor. Coolant enters body 32a at inlet 73 and returns by outlet 75.

Direct current electrical heating element 74 is resistively heated by a source of direct current, such as from electrical power supply 78 provided with engine 26. Power supply 78 for heater 74 is preferably routed directly from power supply 78.. Fluid from reservoir 22 flows around and in contact with heating element 74. In some embodiments of the present invention, heating element 74 includes a thermostat for controlling the application of electrical power.

Alternating current heating element 76 receives electrical power from a ground-based source 79, such as 120-volt AC vac power. Heating element 76 preferably heats body 32a, which conducts the heat into the fluid. Heating element 76 is of a type that would be used for maintaining a heat input into body 32a when engine 26 is not operating and ambient conditions are cold. Although three different types of heaters have been shown and described, the present invention contemplates that any one, several, or all of these heaters may be present.

Figure 4:
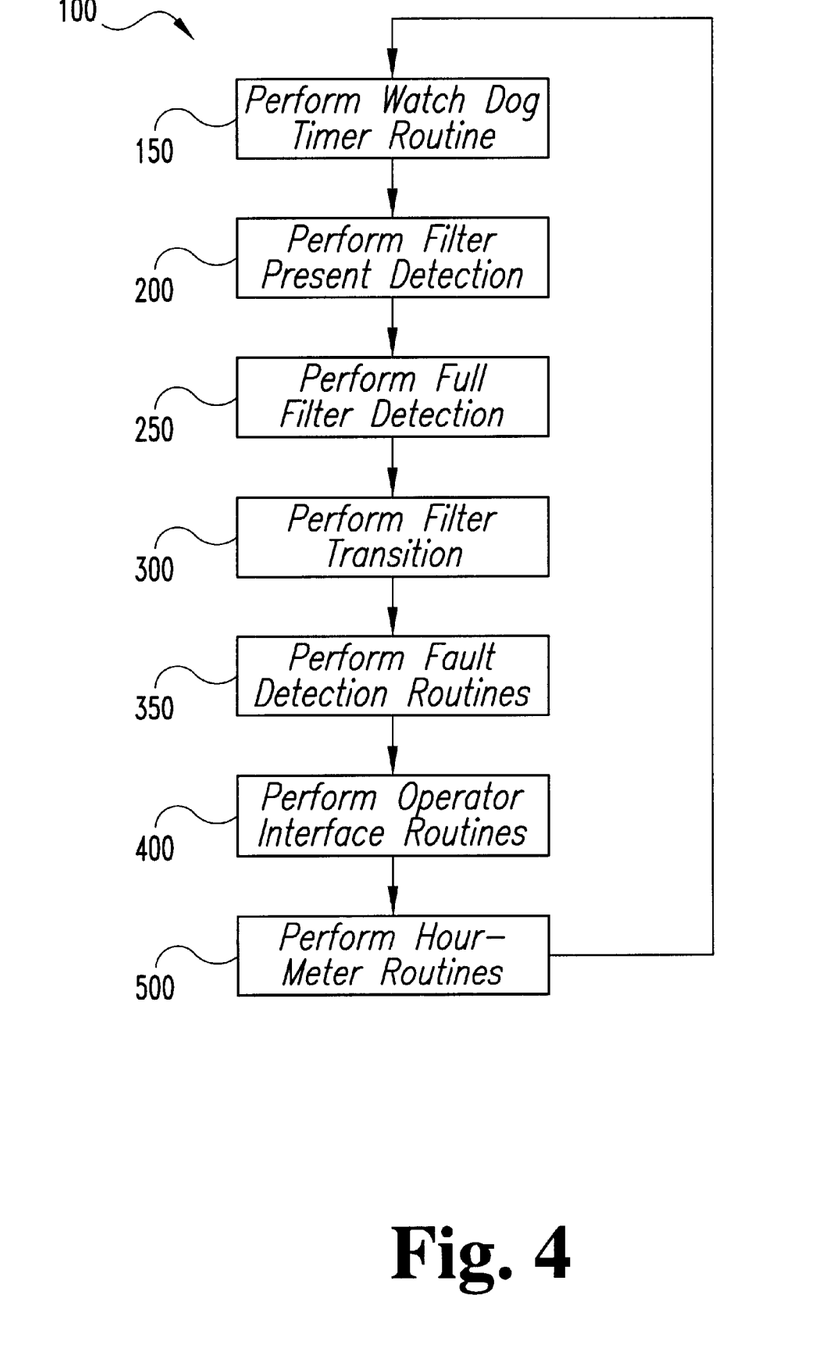
FIG. 4 is a flowchart of a portion of the software of the present invention.

FIG. 4 depicts a simplified flow chart of a preferred controlling software 100 embedded within controller 50. Software 100 represents a run mode for controller 50 which is operable after controller 50 has been powered up and performed various initialization functions known to those of ordinary skill in the art. Included in the initialization functions of the software of controller 50 is a re-seat and seizure prevention subroutine. This subroutine drives valve 34 from its current position to the other position, and then back to the first position, so as to prevent seizure of valve 34 in a given position, and also to re-seat the various seals of valve 34. This subroutine is preferably used following a power-on reset after a predetermined delay during which the engine is assumed to be cranking, and only if fuel temperature is greater than a minimum re-seat temperature, both filters 30 are present, and key switch input 64 is on.

Controlling software 100 preferably performs an algorithm 150 for maintenance of a watchdog timer which must be toggled repetitively by controller 50, or else controller 50 is prevented from actuating valve 34. The watchdog timer is preferably toggled at a minimum rate of about 100-hertz.

Algorithm 200 provides detection of whether or not filters 30 are present. Controller 50 receives signals from proximity sensors 60a and 60b indicating whether or not the corresponding filter 30 has been coupled or uncoupled to body 32a. In one embodiment of the present invention, controller 50 includes software for making a cumulative count of the number of hours for which a particular filter 30 has been coupled to body 32a and power has been supplied to controller 50. If a particular proximity sensor 60a or 60b indicates that a filter 30 is not present, then the cumulative hours for that filter are cleared.

Algorithm 250 provides logic to detect whether or not a filter is full. This logic is shown in more detail in FIG. 5. Although it is understood that the present invention is applicable to conditioning of a variety of fluids, reference will be made to diesel fuel for the following discussion relative to FIG. 5. Algorithm 250 includes a subroutine 260 for detecting whether or not the measured fuel temperature is valid. In a preferred embodiment of the present invention, voltages from temperature sensor 58 that are outside the range of 0.2 vdc–4.49 vdc are considered invalid temperatures, for which controller 50 performs failure accommodation. If the fuel temperature is valid, then subroutine 270 compares the measured temperature to a predetermined temperature. If the temperature is greater than the predetermined temperature, then it is assumed that any subsequent reading of low fuel pressure is due to contaminant clogging of the filter 30 in use. If the fuel temperature is less than the predetermined temperature, then any subsequent measurement of low fuel pressure may be due to the presence of wax in the fuel or high viscosity of the fluid.

Figure 5:
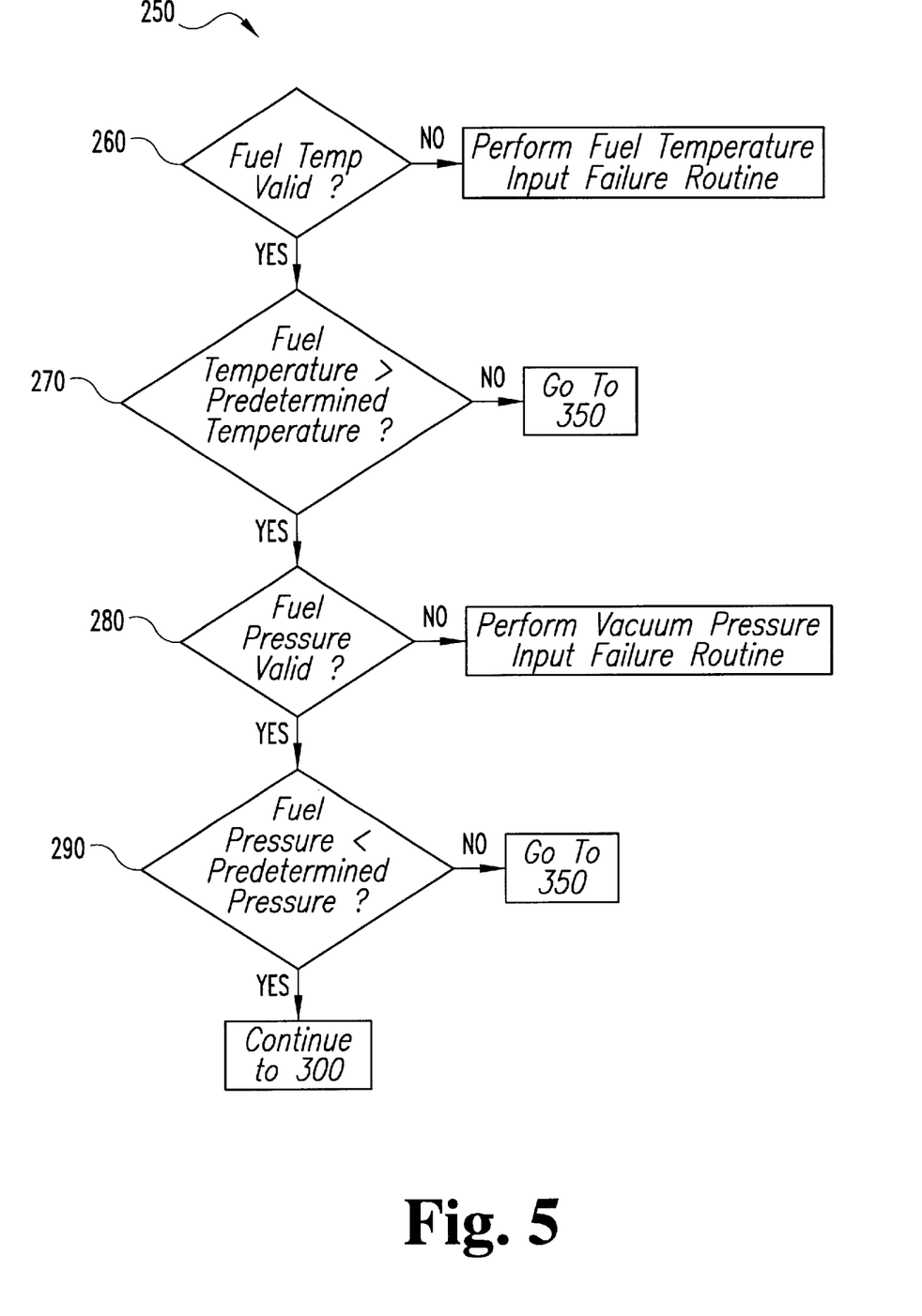
FIG. 5 is a flowchart of a portion of the software of the present invention.

Subroutine 280 checks the validity of the signal being received from vacuum sensor 56. If the voltage received is outside of a range of 0 volts DC to 5 volts DC, then controller 50 performs a failure accommodation routine. If the signal related to fuel pressure is valid, then subroutine 290 determines if the level of fuel pressure is lower than a predetermined pressure that is sub-atmospheric. If the measured sub-atmospheric pressure at vacuum sensor 56 is lower than the predetermined level, and if fuel temperature is greater than a predetermined temperature, then controller 50 will command valve 34 to transition from its current position to the other position, thereby switching from the filter 30 in use to the unused filter 30.

Algorithm 300 determines whether or not a transition should be made from the current filter 30 to the unused filter 30. A transition may be declared if the filter 30 in use has been declared full by algorithm 250, or if the cumulative operational hours for filter 30 has exceeded a predetermined number of hours. If either of these conditions are true, then controller 50 will actuate motor 38 to switch valve 34 from one position to the other position provided that the filter 30 not currently in use is present, is not full, and has not been active since a power-on reset. Otherwise, the present filter will remain in use.

After performing algorithm 300, software 100 then performs algorithm 350 for detection of faults. For example, controller 50 will check that current feedback from motor 38 is within proper minimum and maximum transition current limits, and will also note that the time to transition from one position of valve 34 to the other position of valve 34 occurs within minimum or maximum limits. By measuring current feedback from motor 38, an end of travel state of valve 34 can be detected because of the increase in motor current when the seals of valve 34 are compressed against the inlet bore passageway indicating end of travel. A high motor current indicates a stalled condition. Transition times outside of the preferable range of 30–90 seconds are considered faults. Other fault protection routines including detection of faulted LEDs 62, proximity switches 60, and vacuum sensor 56 are also performed. Various other fault detection routines known to those of ordinary skill in the art may be performed during algorithm 350, or during a power-on reset of controller 50.

Various operator interface routines are performed during algorithm 400. LEDs 62a or 62d are turned on to indicate which filter 30 is active, and either LED 62b or 62c is turned on to indicate which filter 30 has been declared clogged. Some embodiments of the present invention include a display light or other display near the operator console or in the vehicle dashboard to indicate various information, such as one or more full filters 30 or a fault within apparatus 20.

Algorithm 500 monitors the length of time a filter 30 is installed on body 32a. When the cumulative length of time exceeds a predetermined maximum level, the appropriate LED 62b or 62c is illuminated. Upon detection of an uncoupling of the full filter and a re-coupling of another filter by the appropriate proximity switch 60a or 60b, controller 50 will extinguish the illuminated LED 62b or 62c, and reset the cumulative time recorder.

In one embodiment of the present invention, controller 50 must be powered in order to detect whether or not a proximity switch 60a or 60b has indicated an uncoupling or coupling of a filter 30. However, if power was not applied to controller 50 during the replacement, then controller 50 will not have recorded the re-coupling of a new filter 30. In this case, controller 50 will allow one transition from the in-use filter to a filter 30 that controller 50 may otherwise believe is full. If after the transition the new filter 30 is found to be good by having a pressure measured by vacuum sensor 56 greater than a predetermined level, then the new filter will no longer be considered full.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An apparatus comprising:
   an internal combustion engine capable of operation;
   a source of fluid for use with said engine;
   a body defining a bore with an axis;
   a first filter coupled to said body, said first filter having an inlet and an outlet;
   a second filter coupled to said body, said second filter having an inlet and an outlet;
   a receiver of filtered fluid; and
   a valve received within the bore and linearly actuatable along the axis between a first position and a second position, the first position placing the inlet of said first filter in fluid communication with said source and the outlet of said first filter in fluid communication with said receiver, the first position sealing the inlet of said second filter from said source and sealing the outlet of said second filter from said receiver; the second position placing the inlet of said second filter in fluid communication with said source and the outlet of said second filter in fluid communication with said receiver, the second position sealing the inlet of said first filter from said source and sealing the outlet of said first filter from said receiver.

2. The apparatus of claim 1 wherein said first filter or said second filter can be removed with said engine operating.

3. The apparatus of claim 1 which further comprises a first proximity sensor mounted near said first filter, said first proximity sensor producing a first signal corresponding to the coupling or uncoupling of said first removable filter to said body.

4. The apparatus of claim 3 which further comprises means for heating the fluid in said body and wherein said internal combustion engine is a diesel engine.

5. The apparatus of claim 3 which further comprises a vacuum sensor in fluid communication with at least one of the outlet of said first filter or the outlet of said second filter, said vacuum sensor producing a second signal corresponding to the fluid pressure therein.

6. An apparatus for an internal combustion engine, comprising:
   a body;
   a first removable filter coupled to said body;
   a second removable filter coupled to said body;
   a first proximity sensor mounted near said first filter, said first proximity sensor producing a first signal corresponding to the coupling or uncoupling of said first removable filter to said body; and
   a second proximity sensor mounted near said second filter, said second proximity sensor producing a second signal corresponding to the coupling or uncoupling of said second removable filter to said body.

7. The apparatus of claim 6 which further comprises a reservoir providing fluid to said body, a valve actuateable between a first position and a second position, the first position placing said first removable filter in fluid communication with the fluid in said body and the second position placing said second removable filter in fluid communication with the fluid in said body.

8. The apparatus of claim 7 which further comprises an electronic controller operably coupled to said valve, said controller receiving said first signal and said second signal and actuating said valve from one of the first position or second position to the other position in response to one of said first signal or said second signal.

9. The apparatus of claim 7 which further comprises a vacuum sensor in fluid communication with the fluid in said body and producing a third signal corresponding to the fuel pressure thereof.

10. An apparatus for an internal combustion engine receiving fuel from a fuel tank, comprising:
    a first fuel filter with an outlet;
    a second fuel filter with an outlet;
    a valve actuateable from a first position to a second position, the first position permitting flow of fuel through said first fuel filter and preventing flow of fuel through said second fuel filter, and the second position permitting flow of fuel through said second fuel filter and preventing flow of fuel through said first fuel filter,
    a fuel pump with an inlet in fluid communication with the outlet of one of said first fuel filter or said second fuel filter, the outlet of the one said fuel filter having a fuel pressure associated therewith; and
    a vacuum sensor in fluid communication with the outlet of the one said fuel filter and producing a first signal corresponding to the fuel pressure thereof; and
    an electronic controller operably connected to said valve, said controller receiving said first signal and actuating said valve from one of the first position or second position to the other position in response to said first signal corresponding to a pressure lower than ambient pressure.

11. The apparatus of claim 10 which further comprises a temperature sensor producing a second signal corresponding to the temperature of the fluid.

12. The apparatus of claim 11 which further comprises a proximity sensor mounted near one of said first filter or said second filter and a body, the one said filter being removeably coupled to said body, said proximity sensor producing a third signal corresponding to the coupling or uncoupling of the one said filter to said body.

13. The apparatus of claim 12 which further comprises an electronic controller operably connected to said valve, said controller receiving said first signal, said second signal, and said third signal and actuating said valve in response thereto.

14. A method for providing filtered fluid to an internal combustion engine, comprising:
    providing a system of an internal combustion engine, a reservoir of fluid for use with the system, a first filter, a second filter, and a sensor for sensing the presence of a filter;
    determining that the second filter should not be in use;
    sensing with the sensor that the second filter has not been changed;
    flowing fluid to the first filter from the reservoir and from the first filter to the system;
    detecting that the first filter should not be in use; and
    maintaining flow through the first filter after said detecting, said determining, and said sensing.

15. The method of claim 14 which further comprises:
    sensing the installation of a third filter replacing the second filter;
    flowing fluid through the third filter after said sensing the installation of a third filter; and
    preventing flow of fluid through the first filter.

16. The method of claim 15 wherein said sensing is by an electronic sensor.

17. The method of claim 14 which further comprises establishing a time limit, wherein said maintaining flow is for a time corresponding to the time limit.

18. A method for providing filtered fluid to an internal combustion engine, comprising:
    providing a system of an internal combustion engine, a reservoir of fluid for use with tile system, a first filter, and a second filter,
    establishing a time limit;
    flowing fluid to the first filter from the reservoir and from the first filter to the system;
    preventing flow of fluid through the second filter during said flowing fluid to the first filter;
    determining that the first filter should not be in use during said flowing fluid to the first filter;
    flowing fluid to the second filter from the reservoir and from the second filter to the system after said determining;
    maintaining flow of fluid through both filters for a time corresponding to the time limit;
    preventing flow of fluid through the first filter after said maintaining; and
    sensing by an electronic sensor that one of the first filter or the second filler has not been changed.

19. The method of claim 18 wherein the time limit is more than about 30 seconds.

20. An apparatus for an internal combustion engine, comprising a reservoir of fluid;

a body provided with the fluid;

a first removable filter coupled to said body;

a second removable filter coupled to said body;

a valve actuateable between a first position and a second position, the first position permitting flow of the fluid through said first removable filter and the second position permitting flow of the fluid through said second removable filter;

a temperature sensor producing a first signal corresponding to the temperature of the fluid in said body;

an electronic controller operably connected to said valve, said controller receiving said first signal and actuating said valve from one of the first position or second position to the other position in response to said first signal corresponding to a temperature different than a predetermined temperature; and an electrical heating element for heating the fluid in said body, said electronic controller being operably connected to said heating element, said electronic controller operating said heating element in response to said first signal;

wherein said first filter has an outlet, said second filter has an outlet, and which further comprises a vacuum sensor in fluid communication with at least one of said first outlet or said second outlet and producing a second signal corresponding to the fluid pressure therein, said electronic controller receiving said second signal and actuating said valve from one of the first position or second position to the other position in response to said second signal corresponding to a pressure lower than ambient pressure.

21. An apparatus for an internal combustion engine, comprising:

a reservoir of fluid;

a body provided with the fluid;

a first removable filter coupled to said body;

a second removable filter coupled to said body;

a valve actuateable between a first position and a second position, the first position permitting flow of the fluid through said first removable filter and the second position permitting flow of the fluid through said second removable filter;

a temperature sensor producing a first signal corresponding to the temperature of the fluid in said body; and an electronic controller operably connected to said valve, said controller receiving said first signal and actuating said valve from one of the first position or second position to the other position in response to said first signal corresponding to a temperature different than a predetermined temperature;

wherein said first filter has an outlet, said second filter has an outlet, and which further comprises a vacuum sensor in fluid communication with at least one of said first outlet or said second outlet and producing a second signal corresponding to the fluid pressure therein, said electronic controller receiving said second signal and actuating said valve from one of the first position or second position to the other position in response to said second signal corresponding to a pressure lower than ambient pressure.

22. The apparatus of claim 21 wherein said reservoir is a fuel tank, the fluid is fuel, and the internal combustion engine is a diesel engine.

\* \* \* \* \*